United States Patent [19]

Kroggel et al.

[11] Patent Number: 5,202,394
[45] Date of Patent: Apr. 13, 1993

[54] GRAFT POLYMERS WITH A POLYURETHANE GRAFT BASE, PROCESSES FOR THEIR PREPARATION AND THEIR USE

[75] Inventors: Matthias Kroggel, Liederbach; Karl J. Rauterkus; Detlev Seip, both of Kelkheim, all of Fed. Rep. of Germany

[73] Assignee: Hoechst AG, Fed. Rep. of Germany

[21] Appl. No.: 810,721

[22] Filed: Dec. 18, 1991

Related U.S. Application Data

[63] Continuation of Ser. No. 247,694, Sep. 22, 1988, abandoned.

[30] Foreign Application Priority Data

Sep. 24, 1987 [DE] Fed. Rep. of Germany ....... 3732089

[51] Int. Cl.$^5$ ............................................. C08L 75/04
[52] U.S. Cl. .................................... 525/455; 525/454
[58] Field of Search ........................... 525/454, 455

[56] References Cited

U.S. PATENT DOCUMENTS

| 4,521,546 | 6/1985 | O'Connor et al. | 521/137 |
| 4,914,142 | 4/1990 | Takarabe et al. | 525/455 |
| 4,923,929 | 5/1990 | Ohwada et al. | 525/455 |

FOREIGN PATENT DOCUMENTS

| 582892 | 9/1959 | Canada | 525/457 |
| 0207046 | 12/1986 | European Pat. Off. | 525/454 |
| 58-225111 | 12/1983 | Japan . | |

Primary Examiner—James J. Seidleck
Assistant Examiner—Vasu S. Jagannathan
Attorney, Agent, or Firm—Bierman & Muserlian

[57] ABSTRACT

Graft polymers in which carboxylic acid vinyl esters and if appropriate other ethylenically unsaturated monomers are grafted polymerically onto polyurethane graft bases by means of grafting polymerization initiated by free radicals, and hydrolysis products of the graft polymers can be obtained by grafting carboxylic acid vinyl esters with 3 to 20 carbon atoms and if appropriate other ethylenically unsaturated polymerizable monomers, which are copolymerizable if appropriate, in amounts of 10 to 99% by weight, based on the graft polymer, onto a polyurethane graft base by grafting polymerization initiated by free radicals, and if appropriate subsequently partly or completely hydrolyzing the vinyl ester units and if appropriate other hydrolyzable monomer units in the grafted-on polymer radicals of the graft polymers by hydrolysis and/or alcoholysis. Preferred vinyl esters to be grafted on are vinyl acetate and/or vinyl propionate and if appropriate vinyl versatate. The grafting polymerization is carried out in solution or in bulk and can also be carried out in emulsion or suspension.

15 Claims, No Drawings

GRAFT POLYMERS WITH A POLYURETHANE GRAFT BASE, PROCESSES FOR THEIR PREPARATION AND THEIR USE

PRIOR APPLICATION

This application is a continuation of U.S. patent application Ser. No. 247,694 filed Sep. 22, 1988, now abandoned.

DESCRIPTION

The invention relates to graft polymers in which carboxylic acid vinyl esters and if appropriate other ethylenically unsaturated monomers are grafted polymerically onto polyurethane graft bases by means of grafting polymerization initiated by free radicals, as well as to hydrolysis products of the graft polymers, processes for their preparation and their use. The invention also relates, inter alia, to all the subject matter disclosed and claimed in the patent claims.

As is known, polyvinyl carboxylic acid esters, in particular polyvinyl acetates, and polyvinyl alcohols have diverse technical uses.

Thus, for example, polyvinyl acetates are used as adhesives and, depending on their molecular weight, their degree of hydrolysis and if appropriate copolymerized comonomers, polyvinyl alcohols are used as adhesives, textile auxiliaries or film raw materials.

Depending on the field of use, the particular polyvinyl alcohols used often have inadequate properties which distinctly restrict and partly impede their possible uses and their usability. Thus, for example, the water-solubility of polyvinyl alcohols is often too low when these are used as sizes and often too high when they are used as an adhesive.

Because of the high melting points of polyvinyl alcohols, extruded films can be obtained only after prior plasticization, for example with low-molecular-weight polyols, such as, for example, glycerol, diethylene glycol and the like, often in combination with water.

In these cases, exudation of the plasticizer leads to slow embrittlement of the products, and moreover externally plasticized polymers cannot be used for many applications. A possible alternative to this is the production of cast films, but this process likewise leads to usable polyvinyl alcohol films only when external plasticizers of the abovementioned type are used.

The present invention was thus based on the object of eliminating the disadvantages mentioned by preparation of modified polyvinyl carboxylic acid esters and polyvinyl alcohols which have more advantageous properties.

Although modified polyvinyl alcohols which can be obtained by grafting polyvinyl acetate onto polyalkylene oxide graft bases (backbones) and subsequent hydrolysis are also already known (compare, for example, German Patent 1,094,457, German Patent 1,081,229 and European Patent Application 0,207,003), the properties of the resulting compounds are unsatisfactory. For example, films produced from these products largely have inadequate tear strength.

It has now been possible, surprisingly, to achieve the object set by synthesis of graft polymers with a polyurethane graft base (backbone), the graft polymers carrying polymer radicals or polymer chains of carboxylic acid vinyl ester and/or hydrolysis products thereof and if appropriate other monomer units of ethylenically unsaturated polymerizable compounds or hydrolysis products thereof grafted onto the graft base, and the percentage content of components grafted on being 10 to 99% by weight, preferably 30 to 90% by weight and in particular 40 to 80% by weight, based on the total graft polymer.

A very wide-ranging pattern of properties results for the graft polymers according to the invention, depending on the molecular weight and build-up of the polyurethane graft base, and depending on the nature, composition and amount of monomers grafted on, the molecular weight and the degree of hydrolysis of the graft polymer.

The polyurethane graft bases consist of polyurethanes with at least 2 urethane groups in the molecule, and the number of urethane groups per graft base molecular has no particular top limit and in general can assume values higher than 2.

The polyurethane graft bases can be prepared by customary processes of polyurethane synthesis and are preferably synthesized using catalysts, such as, for example, tertiary amines or organic tin compounds, at temperatures between 60° to 120° C., preferably between 70° to 100° C.

They are built up from diol and diisocyanate components. In principle, all the diols which can be used in polyurethane synthesis can be employed. Preferred diols are cycloaliphatic diols, such as, for example, cyclohexane-diols, and aliphatic diols with preferably 2 to 12 carbon atoms. Further preferred compounds are polyalkylene glycols, such as, for example, polypropylene oxides and polybutylene oxides, and copolymers of ethylene oxide, propylene oxide and butylene oxide, preferably block copolymers thereof, and polyethylene oxides are particularly preferred.

Polyethylene glycols, that is to say $\alpha,\omega$-dihydroxypolyethylene oxides, with molecular weights of between 200 and 10,000 g/mol are preferably used, polyethylene glycols with molecular weights of between 400 and 1,500 g/mol being particularly preferred. If appropriate, the polyethylene glycols are used in combination with low-molecular-weight aliphatic diols, such as, for example, 1,4-butanediol, 1,3-propanediol, ethylene glycol and diethylene glycol. A molar ratio of polyethylene glycol to low-molecular-weight aliphatic diol of 1:0.1 to 1:0.7 is preferably present.

Aromatic diisocyanates, such as, for example, m- and p-diisocyanatoxylene, 2,4-diisocyanatotoluene, 2,6-diisocyanatotoluene or mixtures of the two latter isomers, 1,5-diisocyanatonaphthalene, 4,4'-diisocyanatodiphenylmethane and 4,4'-diisocyanatophenyl-benzyl ether are used as the diisocyanate components.

Aliphatic and/or cycloaliphatic diisocyanates are preferably used. Preferred aliphatic diisocyanates are, for example, those with 2 to 12 carbon atoms in the aliphatic radical, such as, for example, ethylene diisocyanate, propylene diisocyanates, tetramethylene diisocyanate and 2,2,4-trimethylhexamethylene diisocyanates. Preferred cycloaliphatic diisocyanates are, for example, 1,4-diisocyanatocyclohexane, 4,4'-methylene-bis(cyclohexyl diisocyanate), 1-methylcyclohexyl 2,4-diisocyanate, 1-methylcyclohexyl 2,6-diisocyanate and 1,3-bis(isocyanatomethyl)-cyclohexane.

The use of 1,6-hexamethylene diisocyanate and/or isophorone diisocyanate is particularly preferred.

The molar ratios of diol to diisocyanate components are preferably between 1:0.99 and 1:0.5, in particular between 1:0.98 and 1:0.7. The average molecular weights of the polyurethanes are preferably between 200 and 50,000 g/mol, in particular between 1,000 and 35,000 g/mol, and particularly preferably between 3,000 and 17,000 g/mol. The average molecular weights (weight-average) are determined in the customary manner. Monohydroxy compounds, such as, for example, methanol, ethanol or other aliphatic alcohols, in particular those of the general formula $C_nH_{2n+2}O$, where $n=1$ to 4, and also monoesterified or monoetherified diols or diol components, can be used to regulate the molecular weight during the preparation of the polyurethanes. Monoisocyanates are moreover used to control the molecular weight.

It should be pointed out that, for example, for a given molecular weight of the graft base, the number of its urethane groups varies directly as a function of the molecular weights of the diol and diisocyanates components used.

Carboxylic acid vinyl esters with 3 to 20 carbon atoms are preferably used for grafting onto the polyurethane graft bases. Vinyl acetate and/or vinyl propionate are particularly preferred, especially vinyl acetate. Mixtures of vinyl acetate and/or vinyl propionate and vinyl versatate are furthermore preferred.

Vinyl acetate is preferably grafted. In the case of partial or complete hydrolysis of the graft polymers subsequent to the grafting polymerization, it is particularly advantageous also to use vinyl propionate, alongside vinyl acetate, during the grafting. In addition, copolymerizable mixtures of carboxylic acid vinyl ester can be grafted, preferably mixtures of vinyl acetate and vinyl versatate, the vinyl versatate content being 0.2 to 10% by weight, preferably 0.5 to 5% by weight, based on the vinyl acetate content. Grafting with various carboxylic acid vinyl esters in the form of block copolymers, if appropriate in combination with other ethylenically unsaturated and copolymerizable monomers, can also be advantageous.

The carboxylic acid vinyl ester can furthermore also be grafted together with other ethylenically unsaturated and copolymerizable monomers, such as, for example, maleic acid, itaconic acid, mesaconic acid, crotonic acid, acrylic acid or esters thereof.

The grafting is carried out using grafting catalysts which start free-radical chains, preferred possible catalysts for this being all the agents which form free radicals and are soluble in the monomers, the monomer mixture or the monomer solution. Organic per-compounds, such as peroxides and percarbonates, and organic azo compounds have proved particularly suitable for the grafting, azo-bis-isobutyronitrile being preferred and dibenzoyl peroxide being particularly preferred. The grafting reaction is carried out in the presence of preferably 0.013 to 1.3 mol. %, in particular 0.026 to 0.27 mol. %, of catalyst which forms free radicals, based on the amount of monomer.

The graft polymers obtained can be converted into partly or completely hydrolyzed products by hydrolysis, alcoholysis or transesterification, the degree of hydrolysis being at least 1 mol. %, preferably 70 to 99 mol. %, based on the number of mol of hydrolyzable monomer units in the graft polymer.

The grafting reaction can be carried out, for example, in emulsion or in suspension, but it is preferably carried out in solution or in bulk.

The monomers to be grafted are preferably metered continuously or discontinuously into the polyurethane graft base, which is initially introduced into the reaction vessel, and it is advantageous to choose the rate of metering and the process parameters so that the formation of homopolymers is as far as possible excluded. If the monomers are in liquid form, they ca be added in bulk or as a solution. The catalyst is preferably dissolved in the monomer liquid or the monomer solution and metered in together with this. However, it can also be taken, at least in part, in the reaction vessel together with the polyurethane graft base. The grafting reaction is preferably carried out at temperatures between 40° and 120° C., in particular between 65° and 100° C., depending on the catalyst used and, especially in the case of bulk polymerization, depending on the polyurethane graft base used.

Alternatively, batch grafting polymerization is also possible, and this process can often lead to mixtures of graft polymers and homopolymers of the monomers to be grafted.

The increase in the viscosity of the reaction mixture which occurs during the graft polymerization, especially in the case of bulk polymerization, often leads to processing problems which can be bypassed, for example, by continuous or discontinuous addition of solvents. Suitable solvents are, preferably, monofunctional alcohols, in particular methanol and ethanol, which can also already be used, if appropriate, for dissolving the monomer to be grafted on.

In the case of solution polymerization, the solvent content in the reaction mixture should be less than 20% by weight, preferably less than 10% by weight, based on the reaction mixture.

After removal of the residual monomers (usually by azeotropic distillation with methanol), the graft polymers obtained according to the invention can be precipitated by introducing the mixture, in its non-hydrolyzed form, into water. However, they can also be converted into partly or completely hydrolyzed products after dilution with a solvent, preferably with methanol, by means of acid catalysts (for example hydrochloric acid, phosphoric acid, p-toluenesulfonic acid and the like) or preferably using alkaline catalysts (for example NaOH, KOH, $NaOCH_3$, $KOCH_3$ and the like), if appropriate using water, by customary processes which are known from the literature.

The amount of alkali metal hydroxide added is preferably 0.1 to 20 mol. %, in particular 0.5 to 10 mol. %, based on the hydrolyzable amount of monomer units grafted on. The hydrolysis is preferably carried out between 20° and 60° C., and in particular by alkaline alcoholysis in a lower alkanol, preferably in methanol.

If, in addition to the vinyl ester units grafted on, the graft polymers also contain other comonomer units of ethylenically unsaturated monomers which can be hydrolyzed, these can be hydrolyzed during the hydrolysis reaction or alcoholysis.

It has furthermore been found that the vinyl ester units with preferably 1 to 4 carbon atoms in the carboxylic acid radical contained in the graft polymers according to the invention undergo alkaline hydrolysis or alcoholytic cleavage particularly readily, whereas vinyl ester units with long-chain carboyxlic acid esters, preferably with longer-chain branched carboxylic acid esters, are more resistant towards alkaline hydrolysis or alkaline alcoholysis, which is of importance for the preparation of a number of partly hydrolyzed graft polymers.

The non-hydrolyzed graft polymers obtained according to the invention are suitable for use as an adhesive, their use as a hot melt adhesive being of particular interest. Products with widely differing melting points can be obtained by varying the polyurethane graft base, the degree of grafting and the nature of the monomers grafted on. The tendency towards blocking can moreover be varied as a function of these parameters. The lated for the resulting polyurethanes (=polyurethane graft bases) can be seen from Table 1. As can be seen from the last column in Table 1, the molecular weight ($M_W$) calculated for the resulting polyurethanes (PU) are between 3,000 and 17,000.

TABLE 1

| | Polyurethane graft bases | | | | | |
|---|---|---|---|---|---|---|
| Example No. | Molar ratio of the diol component[1] constituents | Reaction temperature (°C.) | Catalyst[3], mol %, based on diisocyanate | Diisocyanate component[2] | Molar ratio of diol component: diisocyanate component | Molecular weight calculated for the PU ($M_w$) |
| 1 | PEG 1500:Bu 1:0.48 | 70 | 0.48 | HDI | 1:0.9 | 12,284 |
| 2 | PEG 600:Bu 1:0.10 | 72 | 0.33 | IDI | 1:0.9 | 7,537 |
| 3 | PEG 600:Bu 1:0.43 | 90 | 0.25 | IDI | 1:0.9 | 6,471 |
| 4 | PEG 600:Bu 1:0.67 | 70 | 0.15 | IDI | 1:0.9 | 5,961 |
| 5 | PEG 600:Bu 1:0.17 | 75 | 0.18 | IDI | 1:0.857 | 5,023 |
| 6 | PEG 1500 | 90 | 0.63 | HDI | 1:0.9 | 16,514 |
| 7 | PEG 1500 | 90 | 1.10 | HDI | 1:0.5 | 3,168 |

[1]PEG = polyethylene glycol
Bu = 1,4-butanediol
[2]HDI = hexamethylene 1,6-diisocyanate
IDI = isophorone diisocyanate
[3]Catalyst = 1,4-dimethylpiperazine tendency towards adhesion of these compounds to the most diverse materials likewise depends on the nature of the polyurethane graft base, the degree of grafting and the nature of the monomers grafted on.

Completely and partly hydrolyzed graft polymers according to the invention are particularly suitable for the production of films. The products have the advantage, in comparison with non-modified polyvinyl alcohols, that they have distinctly reduced melting points, depending on the polyurethane graft base, the degree of grafting, the degree of hydrolysis and the nature of the monomers grafted on, so that pressed and extruded films can be produced under mild temperature conditions. Films with different water-solubilities, tear strengths, extensibility and gas barriers, for example towards oxygen, are also obtainable as a function of the parameters listed.

On the basis of their marked tendency towards adhesion to metals, the products can advantageously be used as hot melt adhesives for sticking metals or for coating metals.

The invention is illustrated in more detail by the following examples.

EXAMPLES 1 to 7

Preparation of polyurethane graft base

In each case the diol component and the catalyst are taken under a nitrogen atmosphere in a reaction vessel with a stirrer, and the mixture is heated to a reaction temperature of between 65° and 100° C. The diisocyanate component is then metered in so that the temperature of the reaction mixture does not exceed 120° C., preferably 100° C. When all of the diisocyanate component has been metered in, an after-reaction time of one hour at 80° to 100° C. follows immediately for maximum possible conversion of the reaction components.

The completion of the conversion and thus the end of the reaction can be determined by analysis of the diisocyanate consumption by customary methods (for example IR spectroscopy and titration).

Details of the composition of the reaction mixtures of Examples 1 to 7 and the molecular weight ($M_W$ calcu-

EXAMPLES 8 TO 21

Grafting in bulk and in solution

The polyurethane graft base (from Examples 1 to 7) is in each case melted or dissolved with the addition of small amounts of methanol under a nitrogen atmosphere in a reaction vessel and is heated to a temperature of preferably 60° to 100° C. The monomers to be grafted, if appropriate dissolved in methanol and including the free radical catalyst dissolved in the monomers, are slowly metered into the polyurethane graft base so that the formation of homopolymer which is not grafted on is as far as possible prevented. The temperature of the polymerization mass should not exceed 120° C., preferably 100° C. The metering-in time and the after-reaction time depend on the nature of the monomers used, the reaction temperature, the nature and amount of the free radical catalyst used and the monomers to be grated. The batch size is moreover of importance, since as the batch increases the heat of reaction is removed more slowly, so that there may be the risk of the internal temperature of the reaction mass rising to excessively high values. Details of the composition of the reaction mixtures of Examples 8 to 21 and of the relevant reaction parameters are shown in summary form in Table 2. The metering and after-reaction times given in columns 7 and 8 of Table 2 relate to batch sizes with 50 g of polyurethane graft base, with the exception of Examples 8, 9 and 15. The monomers used are mixtures of vinyl acetate+vinyl versatate in Examples 10 to 12, and only vinyl acetate is used in the other examples. The solvent methanol is additionally used in Examples 17 and 18. The limit viscosity figures [η] given in the last but one column of Table 2 were determined in tetrahydrofuran (THF) solution at 25° C. in an Ostwald viscometer.

The free radical polymerization reaction is stopped by addition of hydroquinone in methanolic solution. Unreacted monomers are then removed by azeotropic distillation with methanol. The graft polymer in each case obtained is isolated by introduction of the methanolic polymer solution into water or by distilling off the solvent. The graft polymers can be dried at 50° to 70° C., if appropriate in vacuo.

preferably possible without difficulties with degrees of hydrolysis of more than 80%. Such gels can then be granulated by means of customary mills and the gran-

TABLE 2

Graft polymers

| Example No. | Pu[1] from Example No. | Vinyl acetate metered in, in g/g of PU | Catalyst, mol %, based on the monomers | | Temperature at the start of polymerization °C. | Monomer metering time in minutes | After-reaction time in minutes | Amount of monomer grafted % by weight | $[\eta]$ THF 25° C. | Calculated average molecular weight $M_w$ in g/mol |
|---|---|---|---|---|---|---|---|---|---|---|
| 8[2] | 1 | 2.32 | BSO[8] | 0.2 | 75 | 190 | 45 | 68.4 | 38.6 | 38,912 |
| 9[2] | 1 | 3 | BSO | 0.2 | 77 | 200 | 45 | 74 | 41.9 | 47,237 |
| 10 | 2 | 1.47[3] | BSO | 0.2 | 72 | 75 | 120 | 57.2 | 30.1 | 17,612 |
| 11 | 2 | 3.92[3] | BSO | 0.2 | 74 | 255 | 120 | 78.6 | 25.8 | 35,153 |
| 12 | 2 | 1.44[4] | BSO | 0.2 | 74 | 120 | 120 | 58.5 | 23.1 | 18,143 |
| 13 | 3 | 2.32 | BSO | 0.2 | 65 | 220 | 45 | 68.8 | 16.6 | 19,613 |
| 14 | 3 | 4.0 | BSO | 0.2 | 68 | 330 | 45 | 79.0 | 23.8 | 28,889 |
| 15[7] | 3 | 3.5 | BSO | 0.2 | 68 | 450 | 45 | 77.2 | 19.6 | 26,375 |
| 16 | 4 | 4.0 | BSO | 0.2 | 70 | 330 | 45 | 79.4 | 29.3 | 26,540 |
| 17[5] | 5 | 2.32 | AIBN[9] | 0.271 | 56 | 150 | 45 | 62.4 | 19.7 | 13,369 |
| 18[5] | 5 | 2.32[6] | AIBN | 0.271 | 62 | 180 | 45 | 64.1 | 22.0 | 13,975 |
| 19 | 5 | 2.32 | AIBN | 0.027 | 64 | 150 | 45 | 64.2 | 29.1 | 14,015 |
| 20 | 6 | 4.0 | BSO | 0.266 | 77 | 210 | 90 | 80.0 | 25.6 | 83,258 |
| 21 | 7 | 1.5 | BSO | 0.266 | 70 | 70 | 120 | 58.5 | 14.9 | 7,619 |

[1]PU = polyurethane graft base;
[2]based on 75 g of PU;
[3]+2% by weight of vinyl versatate, based on the vinyl acetate;
[4]+4% by weight of vinyl versatate, based on the vinyl acetate;
[5]PU was taken with 0.1 g of methanol per g of PU;
[6]+0.3 g of methanol per g of PU;
[7]based on 1,710 g of PU;
[8]BSO = dibenzoyl peroxide;
[9]AIBN = azo-bis-isobutyronitrile

EXAMPLES 22 TO 35

Synthesis of partly and completely hydrolyzed graft polymers

Graft polymers from Examples 8 to 21 are dissolved, for partial or complete hydrolysis, in methanol and methanolic sodium hydroxide solution (5 to 25%) by weight) is added. Polymeric hydrolysis products with different degrees of hydrolysis are obtained, depending on the amount of alkali and the reaction time and depending on the reaction temperature and the degree of grafting of the graft polymer. Partial hydrolysis reactions are preferably carried out with the addition of water to the methanolic hydrolysis solution (compare Example 29).

It is advantageous to take the graft polymers to be hydrolyzed in methanolic solution in a concentration such that a gel forms during the hydrolysis, which is ules can be washed with methanol and filtered off with suction, for example, over a so-called Buchner funnel. Products which are not obtained in gel form can be isolated after removal of the solvent by distillation or by introducing them into water. Precipitation of the products with organic solvents, such as, for example, ethyl acetate or acetone, can occasionally also be successful. When the reaction time has ended, the hydrolysis reactions can be stopped by addition of carboxylic acids, preferably an amount of acetic equivalent to the sodium hydroxide solution used.

The hydrolysis products are dried at temperatures of up to 70° C., advantageously in vacuo.

Details of the starting components and the reaction conditions and of the property parameters of the hydrolysis products are shown in summary form for Examples 22 to 35 in Table 3.

TABLE 3

Hydrolysis products of graft polymers

| Example No. | 35% by weight of methanolic graft polymer solution from Example No. | Amount of NaOH added in mol %, based on the ester units grafted on | Gel formation of the hydrolysis mixture[3] after minutes | Hydrolysis reaction time in minutes | Degree of hydrolysis in %, based on the vinyl ester units | % by weight of vinyl alcohol units, calculated |
|---|---|---|---|---|---|---|
| 22 | 8 | 5 | 7 | 45 | 98.8 | 52.0 |
| 23 | 9 | 5 | 6 | 45 | 98.6 | 58.5 |
| 24 | 10 | 5 | 15 | 45 | 97.6 | 50.5 |
| 25 | 11 | 5 | 10 | 45 | 98.5 | 63.6 |
| 26 | 12 | 5 | 19 | 45 | 97.4 | 40.5 |
| 27 | 13 | 5 | 12 | 45 | 96.3 | 49.1 |
| 28 | 14 | 5 | 8.5 | 45 | 97.2 | 62.1 |
| 29[2] | 15 | 1.5[1] | 42 | 75 | 78.4 | 47.9 |
| 30 | 16 | 5 | 8.5 | 45 | 97.1 | 62.5 |
| 31 | 17 | 5 | 11.5 | 45 | 97.9 | 45.0 |
| 32 | 18 | 5 | 8.5 | 45 | 98.4 | 46.9 |
| 33 | 19 | 5 | 8.5 | 45 | 98.2 | 46.9 |
| 34 | 20 | 5 | 6 | 45 | 99.0 | 66.7 |
| 35 | 21 | 5 | 5 | 45 | 99.2 | 41.5 |

[1]+33.5 mol % of water, based on the ester units grafted on
[2]Hydrolysis from 55% strength methanolic solution
[3]The hydrolysis reaction is in each case carried out at 20 to 25° C.

In Examples 36 to 40, DSC measurements (DSC=differential scanning calorimetry) were furthermore carried out on graft polymers hydrolyzed according to the invention, which can also be called grafted polyvinyl alcohols, and the values obtained were compared with analogous comparison values such as have been obtained in Comparison Examples 1 to 4 on commercially available polyvinyl alcohols (PVAL) with degrees of hydrolysis of about 98%, films of which, inter alia, show high tear strength. The Mowiol grades 4-98, 10-98, 10-98 and 28-98 from Hoechst AG were used as the commercially available polyvinyl alcohols. Although these polyvinyl alcohols have practically the same degrees of hydrolysis amongst themselves (about 98%), they differ inter alia in respect of their viscosity numbers and thus in their molecular weights, the 4 products having viscosity numbers in the above sequence 4, 10, 20 and 28 mPa.s, measured in accordance with DIN 53 015, in each case in 4% strength aqueous solution at 20° C.

The degrees of hydrolysis (in %, based on the hydrolyzable monomer units in the non-hydrolyzed starting graft polymer), the melting points (m.p., °C), the crystallization points on cooling ($T_{cryst}$ in °C) and the fusion enthalpies ($\Delta H$ in Joules/g) of Examples 36 to 40 and the analogous values of Comparison Examples 1 to 4 are shown in summary form in Table 4.

As the $\Delta H$ values in the last column of Table 4 show, the polyvinyl alcohols of Comparison Examples 1 to 4 have considerably higher crystalline contents than the hydrolyzed graft polymers of Examples 36 to 40 according to the invention, since the $\Delta H$ values of the former are distinctly higher than the $\Delta H$ values of the latter. The melting points (m.p, °C) of the hydrolyzed graft polymers in Examples 36 to 40 according to the invention are furthermore distinctly lower than the melting points in Comparison Examples 1 to 4. The lower crystallinity and the lower melting points for the hydrolyzed graft polymers according to the invention lead to surprising properties which manifest themselves extremely advantageously inter alia in thermoplastic processing of the products. Thus, in thermoplastic processing of hydrolyzed graft polymers according to the invention, if appropriate only water is necessary as the plasticizer, and not organic plasticizers, such as, for example, glycerol or other polyols, in contrast to commercially available polyvinyl alcohol, which usually cannot be processed as a thermoplastic without an organic plasticizer. The advantageous properties of the grafted polyvinyl alcohols in this respect thus opens up a wide field of application which could not hitherto be achieved.

TABLE 4

Melting point (m.p.), fusion enthalpy ($\Delta H$) and crystallization point on cooling ($T_{cryst}$) of polyvinyl alcohols (PVAL) and of hydrolyzed graft polymers

| | | Degree of hydrolysis % | M.p. °C. | $T_{cryst}$ °C. | $\Delta H$ J/g |
|---|---|---|---|---|---|
| Comparison Example No. | PVAL, Mowiol grade | | | | |
| 1 | 4-98 | 97.8 | 226 | 191 | 57.7 |
| 2 | 10-98 | 98.2 | 228 | 190 | 58.6 |
| 3 | 20-98 | 98.2 | 225 | 190 | 62.0 |
| 4 | 28-98 | 97.6 | 234 | 192 | 76.0 |
| Example | Hydrolyzed graft polymer from | | | | |

TABLE 4-continued

Melting point (m.p.), fusion enthalpy ($\Delta H$) and crystallization point on cooling ($T_{cryst}$) of polyvinyl alcohols (PVAL) and of hydrolyzed graft polymers

| | | Degree of hydrolysis % | M.p. °C. | $T_{cryst}$ °C. | $\Delta H$ J/g |
|---|---|---|---|---|---|
| No. | Example No. | | | | |
| 36 | 22 | 98.8 | 206 | 188 | 22.5 |
| 37 | 24 | 97.6 | 197 | 177 | 15.5 |
| 38 | 25 | 98.5 | 207 | 189 | 27.0 |
| 39 | 27 | 96.3 | 200 | 183 | 11.5 |
| 40 | 33 | 98.2 | 205 | 190 | 20.0 |

EXAMPLES 41 AND 42

Hot melt adhesives

In Examples 41 and 42, in each case non-hydrolyzed graft polymers from Examples 8 to 9 were melted at 120° to 130° C. and the melts were drawn to 100 µm thick films on polyester film (PE film) by means of a doctor blade. The PE films coated with hot melt adhesive in this way were then stuck with the sides coated with the hot melt adhesive film to steel sheet at 120° C. without applying pressure.

The adhesive strength of the hot melt adhesives was then determined on the stuck surfaces. For this, the PE film and steel sheet were stuck over a width of 2.5 cm to laminated test specimens and the adhesive strength (in N/cm) was determined by pulling off the PE film with a pull-off rate of 30 cm/minutes at 20° C. The results are shown in summary form in Table 5.

In Examples 41 and 42, the shear strength was furthermore determined on PE film/steel sheet laminates stuck with non-hydrolyzed graft polymers from Examples 8 and 9, the glueings being produced as described above to the production of the test specimens for determination of the adhesive strength. To determine the shear strength, stuck PE film/steel sheet test specimens with a sticking are $(1.5 \times 1.5)cm^2$ in size were used, the two stuck layers of laminate were subjected to a load of 1 kg parallel to the plane of the glueing at 20° C., and the time (in hours) taken to separate the two layers of laminate was determined as a measure of the shear strength of the hot melt adhesive. The results are also shown in summary form in Table 5.

The measurement figures in Table 5 show that the graft polymers according to the invention have a good adhesive strength and also a good shear strength when used as a hot melt adhesive.

TABLE 5

Graft polymers as hot melt adhesives

| Example No. | Hot melt adhesive from Example No. | Adhesive strength of the hot melt adhesive at 20° C., in N/cm | Shear strength of the hot melt adhesive at 20° C. in hours under a load of 1 kg |
|---|---|---|---|
| 41 | 8 | 14.0 | 9.5 |
| 42 | 9 | 13.6 | 10.5 |

EXAMPLES 43 to 49

In Examples 43 to 49, the tear strength ($N/mm^2$), the elongation (%) and the permeability to oxygen (ml of $O_2/m^2 \times day \times bar$) at various relative atmospheric humidities were determined on films of hydrolyzed graft polymers according to the invention. For this, test films about 200 μm thick (produced at 200° C. under a pressure of 7.5 kg/cm$^2$) were produced form the hydrolyzed graft polymer powders to be tested. The resulting films were first conditioned by storage for 3 days at 50% relative atmospheric humidity and 23° C.

The tear strength and the elongation were determined by means of an Instron apparatus at 23° C. and 50% relative atmospheric humidity.

The O$_2$ permeabilities were measured by means of an Oxtran 100 apparatus at various atmospheric humidities, and in particular at 0, 53 and 93% relative atmospheric humiditiy.

The film materials used and the results of the measurements are shown in summary form in Table 6.

As can be seen from the last two columns of Table 6, the permeabilities to O$_2$ increase as the relative atmospheric humidity increases. The advantageous tear strength and elongation values from Table 6 allow a broad spectrum of use for the hydrolyzed graft polymers according to the invention, together with their other advantageous properties.

TABLE 6

| | Films of hydrolyzed graft polymers | | | | |
|---|---|---|---|---|---|
| Example No. | Film of hydrolyzed graft polymer from Example No. | Tear strength N/mm$^2$ | Elongation % | Permeability to O$_2$ ml/m$^2$ × day × bar | Relative atmospheric humidity % |
| 43 | 22 | 10.7 | 240 | | |
| 44 | 23 | 13.5 | 224 | | |
| 45 | 24 | 12.2 | 237 | | |
| 46 | 25 | 20.7 | 103 | | |
| 47 | 26 | 5.5 | 297 | | |
| 48 | 27 | 13.8 | 202 | 46.3 | 0 |
| | | | | 49.9 | 53 |
| | | | | 118.0 | 93 |
| 49 | 30 | 9.1 | 331 | 12.9 | 0 |
| | | | | 13.2 | 53 |
| | | | | 65.0 | 93 |

We claim:

1. A graft polymer with a polyurethane graft base, the graft base containing at least 2 urethane groups in the molecular and monomer units derived from diisocyanates and monomer units derived from diols wherein the polyurethane graft base contains lower alkoxy radicals and/or hydroxyl groups and optionally end group units derived from monoisocyanates and wherein polymer radicals of units of carboxylic acid vinyl esters with 3 to 20 carbon atoms and/or hydrolysis products thereof are grafted onto the polyurethane graft base by polymerization in organic solution or bulk polymerization.

2. The graft polymer of claim 1 also containing small amounts of units of monofunctional isocyanates.

3. The graft polymer of claim 1 also containing small amounts of units of monohydroxy compounds.

4. The graft polymer of claim 1 also containing units of other ethylenically unsaturated and copolymerizable monomers.

5. The graft polymer of claim 1 also containing units of hydrolysis products thereof.

6. A graft polymer as claimed in claim 1 wherein the polyurethane graft base contains lower alkoxy radicals and/or hydroxyl groups as end groups.

7. A graft polymer as claimed in claim 1 wherein the polyurethane graft base has a molecular weight of between 200 and 50,000 g/mol.

8. A graft polymer as claimed in claim 1 wherein the polyurethane graft base contains at least one monomer unit derived from a member selected from the group consisting of aromatic and/or aliphatic and cycloaliphatic diisocyanates.

9. A graft polymer as claimed in claim 1 wherein the polyurethane graft base contains at least one monomer unit derived from a member selected from the group consisting of alkylene glycol and polyalkylene glycol, or mixtures of these units in the diol components.

10. A graft polymer as claimed in claim 1 wherein the polyurethane graft base contains exclusively or partly monomer units derived from low-molecular-weight diol, in the diol component.

11. A graft polymer as claimed in claim 1 wherein terminal OH groups of the polyurethane graft base are masked or blocked by added-on monoisocyanates.

12. A graft polymer as claimed in claim 1 wherein polymer radicals of at least one of vinyl propionate or vinyl acetate and/or hydrolysis products thereof, are grafted onto the polyurethane graft base in amounts of 10 to 99% by weight, based on the graft polymer.

13. Graft polymers as claimed in claim 1 wherein polymer radicals of vinyl acetate and/or vinyl propionate and vinyl versatate and/or hydrolysis products thereof are grafted onto the polyurethane graft base.

14. A graft polymer as claimed in claim 1 wherein at least one of polymer radicals of vinyl esters and other ethylenically unsaturated monomers alone or copolymerized with the vinyl esters or hydrolysis products thereof are grafted onto the graft base.

15. A graft polymer as claimed in claim 1 wherein the vinyl ester units or other grafted-on and hydrolyzable ethylenically unsaturated monomer units contained in the polymer radicals grafted onto the polyurethane graft base are partly or completely hydrolyzed.

* * * * *